United States Patent [19]
Ade et al.

[11] 3,821,621
[45] June 28, 1974

[54] SAFETY BELT REGULATING APPARATUS

[75] Inventors: Rolf Ade; Werner Gakenholz, both of Bietigheim, Germany

[73] Assignee: SWF Spezialfabrik Fur Antozubehor Gustav Rau GmbH, Bietigheim, Germany

[22] Filed: Mar. 28, 1973

[21] Appl. No.: 345,777

[30] Foreign Application Priority Data
Apr. 7, 1972  Germany............................ 2216726

[52] U.S. Cl.................................. 318/261, 318/293
[51] Int. Cl.............................................. H02p 3/12
[58] Field of Search........... 307/10, 5 B; 318/6, 261, 318/265, 266, 280, 291, 293, 379, 446, 468, 488

[56] References Cited
UNITED STATES PATENTS

| | | | |
|---|---|---|---|
| 3,290,575 | 12/1966 | Modiano............................ | 318/261 |
| 3,526,818 | 9/1970 | Scheibel........................... | 318/293 X |
| 3,601,603 | 8/1971 | Hughson.......................... | 318/293 X |
| 3,731,170 | 5/1973 | Emmert............................ | 318/293 X |

Primary Examiner—E. Dobeck
Assistant Examiner—W. F. Duncanson, Jr.
Attorney, Agent, or Firm—Toren, McGeady and Stanger

[57] ABSTRACT

A motor which responds to operation of a switch drives a winch which winds or feeds a cable that loosens or tightens a safety belt about the passenger of a vehicle. The cable feeds and winds between two limit positions. A control, connected in series with the motor and having a control element, energizes or deenergizes the motor on the basis of signals at the control element. The switch is a polarity reverser in series with the motor and the control. The reverser applies current to the motor in one or the other direction when the control energizes the motor. A first diode couples the polarity reverser to the control element to apply a signal of one polarity to the control element when the reverser applies a current in one direction. A second diode applies a signal of the other polarity to the control element when the reverser applies current in the other direction. Limit switches which respond to the cable being in either of the limit positions disable the control and deenergize the motor. According to one embodiment the control element is a relay coil and the control is its relay contact. According to another embodiment, a switch responds to the tautness of the cable and causes the control to deenergize the cable when the cable is slack.

11 Claims, 2 Drawing Figures

SAFETY BELT REGULATING APPARATUS

REFERENCES TO RELATED COPENDING APPLICATIONS

This application is related to the application of Rolf Ade and Werner Gakenholz Ser. No. 345,780, filed Mar. 28, 1973, assigned to the same assignee as this application, and entitled "Safety Belt Control Apparatus." (T1443).

This application is also related to the application of Werner Gakenholz, Rolf Ade, and Rolf -Dieter Deiss, Ser. No. 345,690 filed Mar. 28, 1973, assigned to the same assignee as this application, and entitled "Automobile Safety Belt Adjusting Apparatus." (T1445).

The contents of the above-identified applications are hereby made a part of this application as if fully recited herein.

BACKGROUND OF THE INVENTION

This invention relates to vehicles with safety devices, and particularly to apparatuses which fasten a safety belt about a passenger by drawing the belt with a motor-driven winch.

Various proposals have been made for automatically fastening and removing a safety belt about and from a motor vehicle passenger in response to operation of a switch which is actuated by hand or by the vehicle door. Among these proposals is one in which a cable is secured to a safety belt and a winch driven by a direct current motor winds and unwinds this cable to apply and remove the safety belt.

An object of the present invention is to improve vehicles with safety apparatuses.

Another object of the invention is to improve safety belt apparatuses for various types of vehicles.

Still another object of the invention is to provide a simple and reliable circuit for controlling the direct current motor of a winch-operated safety belt.

SUMMARY OF THE INVENTION

According to a feature of the invention, these objects are obtained in whole or in part by having the winch drive the motor to feed the cable between two limit positions so as to tighten and loosen the belt and controlling the motor with control means connected in series with the motor and having a control element. The control means energize the motor and deenergize the motor in response to signals applied to the control element. Polarity-reversing means in series with the control means apply current to the control means and the motor in one or the other direction when the control means respond to the control element to energize the motor. A first unidirectional element couples the polarity-reversing means to the control element and applies a signal of one polarity to the control element when the reversing means supplies current in the one direction. A second unidirectional means couples the polarity-reversing means to the control element and applies a signal of the other polarity to the control element when the current supplied to the control means is in the other direction. A first limit switch means in series with the first unidirectional means responds to the cable being in one limit position and causes the control element to make the control means deenergize the motor when the cable is in the one limit position and the current applied by the reversing means to the control means is in the one direction. A second limit switch means in series with the second unidirectional means responds to the cable being in the other limit position and causes the control element to make the control means deenergize the motor when the cable is in the other limit position and the current applied by the reversing means to the control means is in the other direction.

According to another feature of the invention, the control means includes a relay having a contact and the control element is a relay coil.

According to another feature of the invention, the polarity-reversing means includes a first output line and two other output lines. The reversing means further includes operating means for connecting a selected one of the polarities to the first line in dependence upon the actuation of the reversing means, and for connecting the unconnected one of the polarities to one or the other two of the lines in dependence upon actuation of the reversing means. A resistor means connects the other of the two lines together. Thus, when the reversing means is placed in one position to cause current flow in one direction, current flows through the resistor and when the reversing means is switched to produce current in the other direction, current to the motor bypasses the resistor.

According to another feature of the invention, contact means in series with the motor respond to the cable being tight by passing the current flow to the motor, and to the cable being loose by interrupting current flow to the motor.

According to yet another feature of the invention, the control means passes current to the motor in one condition and short-circuits the motor in the other condition.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
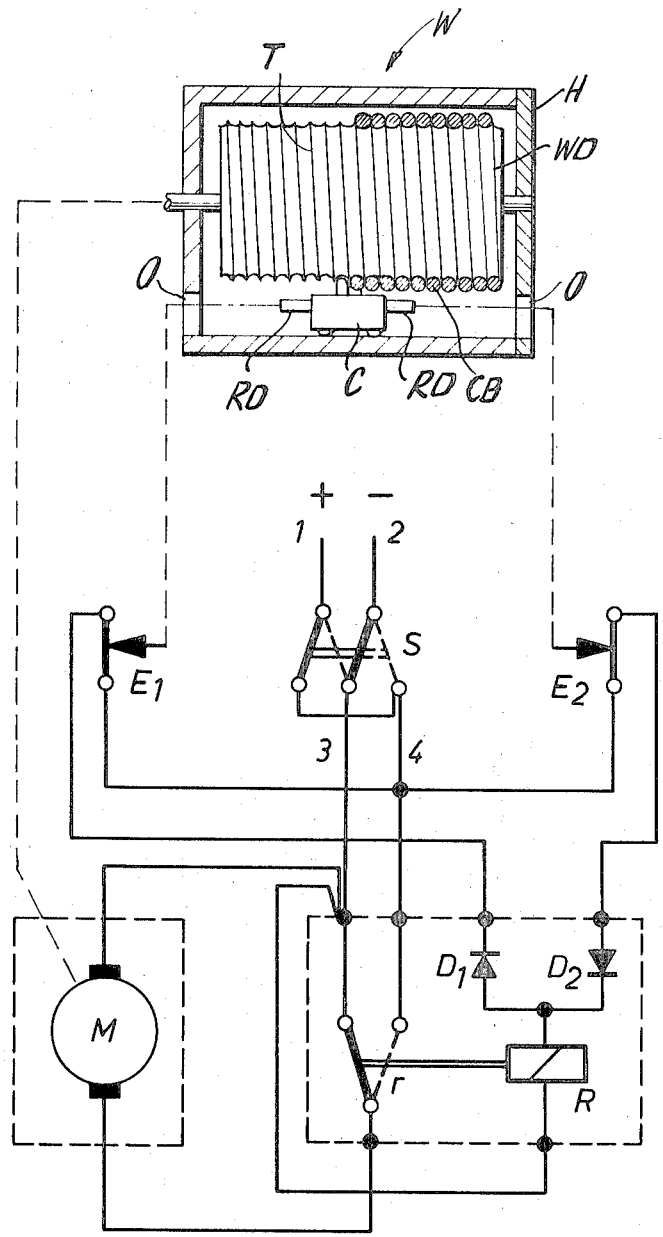
FIG. 1 is a schematic diagram of a winch and circuit for controlling a cable according to one embodiment of the invention.

In FIG. 1, a motor M drives a winch drum WD mounted in the housing H of a winch W. Threads T on the surface of the drum WD drive a carriage C longitudinally along the drum WD as the drum is rotated. The carriage C lays cable CB in the threads T as the drum WD rotates. The carriage C engages the threads T on the drum WD at the last winding of the cable CB. Details of this structure are illustrated in the aforementioned copending application entitled "Safety Belt Control Apparatus" (T1445).

When the carriage C reaches either end of the drum WD as a result of the rotation of the drum, actuating rods RD project through openings O in the housing H and open either of the limit switches $E_1$ or $E_2$. The limit switch which is opened depends upon the end of the drum WD which the carriage C has reached. A double-pole reversing switch S having two switchover contacts feeds a supply voltage arriving over conductors 1 and 2 to the motor M which is a direct current motor. The motor current passes along a conductor 3 from the reversing switch to the motor M. Another conductor 4 passes current from the reversing switch S through a switchover contact r of a relay R. The contact r is shown when the relay is in its unenergized state. In this position, the contact r short-circuits the motor M. When the relay r is energized, the contact r forms a current path from the conductor 4 to the motor M back to the conductor 3. The switch S connects the conductors 3 and 4 to the source. The polarities at the conductors 3 and 4 depend upon the position of the switch S.

A current path for energizing the relay r starts at the conductor 3 and passes directly to the winding of the relay R. From there a diode $D_1$ completes the current path to the conductor 4 through the limit switch $E_1$. Thus, when the conductor 3 is positive and the conductor 4 negative, opposite to the position shown for the switch S, current flows from the conductor 3 through the winding of the relay R through the diode $D_1$, through the limit switch $E_1$, to the conductor 4.

A diode $D_2$ poled in a direction opposite to the diode $D_1$ completes a current path from the conductor 4 to the relay R, through the limit switch $E_2$. Thus, when the conductor 4 is positive and the conductor 3 is negative, corresponding to the position shown for the switch S, current flows from the conductor 4 through the limit switch $E_2$, through the diode $D_2$, through the winding of the relay R, to the conductor 3.

Thus, as long as the carriage C is between the positions where it opens the limit switches $E_1$ or $E_2$, either position of the switch S energizes the relay R and shifts the contact r from the position shown in a solid line to the position shown by the broken line. This closes the circuit through the motor and drives the motor in one direction. If the position shown for the switch S represents the windup direction of the motor, the drum WD of the winch winds up the cable CB and moves the carriage C to the left.

During the movement the carriage lays the cable in the threads T which in turn move the carriage. The carriage C moves to the right so that the rod RD eventually actuates the limit switch 1. This deenergizes the relay R, causes the contact r to short-circuit the motor, and stops the motor. Current cannot flow to the winding of the relay R despite the fact that the limit switch $E_2$ remains closed because the diode $D_2$ stops the current from the now positive line or conductor 4.

On the other hand, if the switch S1 is placed in the opposite position, the relay R is energized as long as the carriage does not open the limit switch $E_2$. Under these circumstances, the relay R, because it is energized, shifts the contact r to the right. This causes the motor to rotate the drum WD so as to unwind the cable CB from the threads T. As a result, the carriage C moves to the right until the left rod RD passes through the opening O of the housing H and opens the limit switch $E_2$. The current which has been passing from the conductor 3, through the winding of the relay R, through the diode $D_2$ and the limit switch $E_2$, to the conductor 4 is now interrupted. This again causes the contact r to short-circuit the motor M so as to stop rotation of the drum WD.

The reversing switch S is a manually actuated switch. According to another embodiment of the invention, the switch is actuated by closing a vehicle door. It applies a safety belt to the occupant of the vehicle.

In summary, when the limit switches $E_1$ and $E_2$ are closed, the relay R operates through a circuit composed of members 1, S, 4, $E_2$, $D_2$ or $E_1$ and $D_1$, R, 3, S, and 2. Hence, the shortcircuit on the direct current motor M is removed by the contact r and the motor is driven so that the cable is wound and the safety belt applied. When the winch reaches the end position corresponding to the cable being wound, the limit switch $E_1$ is opened so that the relay R is deenergized. The contact r switches off the motor, and short-circuits it. During these operations, the limit switch $E_2$ is inoperative because the diode $D_2$ blocks current passing through this limit switch.

When the switch S is reversed to the position shown by the broken lines, the circuit through the limit switch $E_1$ and the diode $D_1$ is inoperative and a circuit is established for the relay R through the limit switch $E_2$ and the diode $D_2$. When the contact r is drawn to the right, the direct current motor unwinds the winch and feeds out the cable CB. The motor M keeps running in this direction until the switch $E_2$ is opened.

According to this embodiment, only the contact r needs to be a heavy duty switch. Only it has to break the current of the motor. The limit switches $E_1$ and $E_2$, and the diodes $D_1$ and $D_2$, merely carry relay operating currents.

Figure 2:
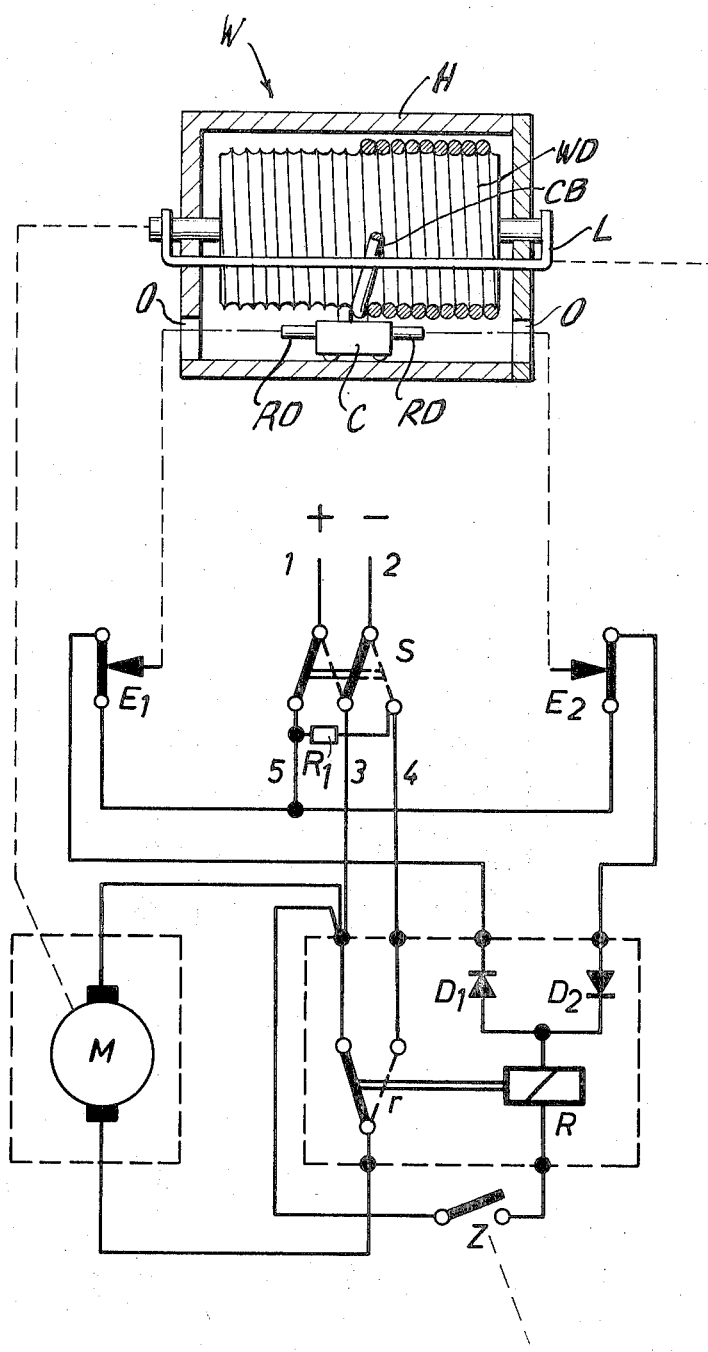
FIG. 2 is a schematic diagram of a winch and circuit for controlling a cable according to another embodiment of the invention.

The apparatus of FIG. 2 corresponds to that of FIG. 1. However, here a cross member or lever L is articulated about the axle of the drum WD. The lever L opens a switch Z when a spring SP lifts it upwardly. The cable CD emerging from the winch W pushes the lever L downwardly when the cable is taut. This closes the switch Z which is in series with the winding of the relay R. In this way a slack cable CB disables the relay R and hence the motor M.

In FIG. 2 the circuit is similar to that in FIG. 1. However, it differs in that a resistor R1 is connected from the conductor 4 to the opposite conductor which is here identified as 5. The conductor 4 is connected to the contact r. The conductor 4 is connected to the series connections $E_1$ and $D_1$, and $E_2$ and $D_2$. Of course, the switch Z of FIG. 2 constitutes a difference from that of FIG. 1.

Because of the resistor R1, the direct current motor M runs more slowly in the position of the reversing switch S shown in solid lines than in the position of the reversing switch S shown in broken lines. The resistor R1 is cut out of the motor circuit when the switch S is thrown to the right and remains in the motor circuit when the switch S is thrown to the left. The resistor R1 is switched in and out of the relay circuit.

The resistor R1 has a low value compared with the resistance of the winding of the relay R so that the operation of the relay R is not adversely affected. As shown, the resistor R1 allows the safety belt to be removed more rapidly than it is applied.

The switch Z is actuated in dependence upon the tension of the switch cable and switches off the relay cable if the cable becomes slack. Hence, it switches off the motor circuit. Buckling of the cable, therefore, is avoided. The motor is ready for operation again after removal of the slackness of the cable. The operation of the lever L shown in FIG. 2 is described in detail in the copending application (T1445 entitled "Safety Belt Monitoring Apparatus").

While embodiments of the invention have been described in detail, it will be obvious to those skilled in the art that the invention may be embodied otherwise without departing from its spirit and scope.

What is claimed is:

1. In a vehicle safety belt system wherein a winch driven by a motor draws and feeds a cable between two limit positions to tighten and loosen the belt, a circuit for controlling the motor, comprising control means connected in series with the motor and having a control element, said control means energizing the motor and deenergizing the motor in response to signals applied to said control element, polarity reversing means in series with said control means for applying current to said control means and the motor in one or the other direction when said control means responds to the control element to energize the motor, first unidirectional means coupling said polarity reversing means to said control element for applying a signal of one polarity to said control element when said reversing means supplies current in one direction, second unidirectional means coupling said polarity reversing means to said control element for applying a signal of the other polarity to said control element when the current applied to said control means is in the other direction, first limit switch means in said first unidirectional means and responsive to the cable being in one limit position for causing said control element to make said control means deenergize the motor when the cable is in the one limit position and the current applied by said reversing means to said control means is in the one direction, second limit switch means in said second unidirectional means and responsive to said cable being in the other limit position for causing said control element to make said control means deenergize the motor when the cable is in the other limit position and the current applied by said reversing means to said control means is in the other direction.

2. A circuit as in claim 1, wherein said control means is a relay having a contact, said control elements being a relay coil.

3. A circuit as in claim 1, wherein said circuit reversing means includes a first output conductor, a second output conductor and a third output conductor, said reversing means applying one or the other polarity to said first conductor on the basis of the condition of said reversing means, said reversing means applying the other polarity to each of said second and third conductors on the basis of the condition of said reversing means, resistance means connected between said second and third output conductors, one of said second and third output conductors being connected to said control means and the other of said output conductors being connected to said limit switch means.

4. A circuit as in claim 3, wherein said control means is a relay having a contact, said control elements being a relay coil.

5. A circuit as in claim 3, wherein disabling switch means connected to said control element and responsive to the tautness of the cable disables the control elements and said control means in response to the cable being slack and enables the control element at said control means in response to the cable being taut.

6. A circuit as in claim 5, wherein said control means is a relay having a contact, said control elements being a relay coil.

7. An apparatus as in claim 5, wherein said circuit reversing means includes a first output conductor, a second output conductor and a third output conductor, said reversing means applying one or the other polarity to said first conductor on the basis of the condition of said reversing means, said reversing means applying the other polarity to each of said second and third conductors on the basis of the condition of said reversing means, resistance means connected between said second and third output conductors, one of said second and third output conductors being connected to said control means and the other of said output conductors being connected to said limit switch means.

8. An apparatus as in claim 4, wherein disabling switch means connected to said control element and responsive to the tautness of the cable disables the control elements and said control means in response to the cable being slack and enables the control element at said control means in response to the cable being taut.

9. A circuit as in claim 2, wherein said contact forms a switchover switch, said switchover switch connecting the motor to said reversing means in one position and short-circuiting the motor in the other position.

10. A circuit as in claim 9, wherein said circuit reversing means includes a first output conductor, a second output conductor and a third output conductor, said reversing means applying one or the other polarity to said first conductor on the basis of the condition of said reversing means, said reversing means applying the other polarity to each of said second and third conductors on the basis of the condition of said reversing means, resistance means connected between said second and third output conductors, one of said second and third output conductors being connected to said control means and the other of said output conductors being connected to said limit switch means.

11. A circuit as in claim 9, wherein disabling switch means connected to said control element and responsive to the tautness of the cable disables the control elements and said control means in response to the cable being slack and enables the control element at said control means in response to the cable being taut.

* * * * *